United States Patent [19]
Zimmermann et al.

[11] 3,879,739
[45] Apr. 22, 1975

[54] VEHICLE TRIP RECORDER

[75] Inventors: Hans Zimmermann, Villingen-Schwenningen; Helmut Müller, Saint Georgen, both of Germany

[73] Assignee: Kienzle Apparate GmbH, Villingen, Black Forest, Germany

[22] Filed: June 12, 1974

[21] Appl. No.: 478,822

[30] Foreign Application Priority Data
June 14, 1973 Germany.......................... 2330227

[52] U.S. Cl. .................. 346/146; 70/160; 70/433; 346/62
[51] Int. Cl. ............................................. G07c 5/12
[58] Field of Search ................ 346/7, 41, 62–64, 346/121, 123, 145, 146; 70/433, 160

[56] References Cited
UNITED STATES PATENTS
2,743,987  5/1956  Meer............................. 346/64
3,000,687  9/1961  Haupt............................ 346/7

*Primary Examiner*—Joseph W. Hartary
*Attorney, Agent, or Firm*—Michael S. Striker

[57] ABSTRACT

A vehicle trip recorder of the type having a housing, a recording arrangement which scribes a record indicative of vehicle utilization, an adjusting arrangement for adjusting the recording arrangement to operate in one or another operative mode, and a cover for the housing which can be latched. The invention provides an improvement which includes cooperating latching portions on the cover and the housing which are engageable for latching the cover, and an actuating arrangement which is accessible exteriorly of the cover and which is operative in the latched condition of the latter for displacing some of the latching portions in the engaged condition of the same between two control positions in each of which they operate upon the adjusting arrangement to effect adjustment of the recording arrangement to one of the operative modes thereof.

7 Claims, 9 Drawing Figures

VEHICLE TRIP RECORDER

BACKGROUND OF THE INVENTION

The present invention relates generally to a vehicle trip recorder, and more particularly to a vehicle trip recorder of the type having a recording arrangement which scribes a record that is indicative of vehicle utilization.

Vehicle trip recorders, usually used to record trips of motor vehicles, are already well known in the art. Broadly speaking, these arrangements comprise a housing, a recording arrangement located in the housing and serving to scribe upon a paper disc or other record carrier a graph which is indicative of vehicle utilization, and a cover which can be locked and which permits access to the interior of the trip recorder so that the record carrier can be changed, which is usually done after every trip.

The purpose of these trip recorders is to indicate how a vehicle has been utilized in a certain period of time. Thus, while the vehicle is in motion the trip recorder will indicate speed of movement, engine rpm, distances travelled, fuel consumption and/or other data. It will also indicate the times during which the vehicle has merely been standing, rather than being in motion. Such trip recorders serve the purpose of providing the vehicle owner with information concerning the economy of operation of the vehicle, the distances travelled by a vehicle during a certain time period and in conjunction with a particular job or jobs, and with information pertaining to the wage calculations for the driver, such as the time spent driving and the time spent resting.

Of particular importance in the use of the trip recorder is to obtain a record of the times during which the vehicle was in motion. Various types of arrangements have become known in the prior art for scribing a graph which indicates the times during which the vehicle was in motion, and the other data pertinent to these times, such as fuel consumption, speed and the like. The perhaps most common type of device scribes upon the record carrier in response to vibrations which are transmitted to it during the movement of the vehicle. Evidently, this type of arrangement is usable only when the vehicle is in motion. There are other types of arrangements known in the prior art, for instance utilizing an electromotor that operates them, which permit recording not only of the times during which the vehicle is in motion but also of the times during which the vehicle is standing still. This type of equipment can be manually adjusted so as to set it to start with a particular mode of operation, and will automatically switch to indicate a different mode of operation. For example, a driver who begins loading his vehicle for a particular job may set the device at the beginning at the loading time, to indicate that the timed period for the job has begun. When the loading is finished and the driver begins to move his vehicle, the device will automatically shift from recording the stand-still time to recording the movement of the vehicle.

In many instances in which trips must be made over long distances it is customary, and also advisable, to have at least two drivers on board the vehicle, for instance on board of transcontinental trucks or the like. This makes it possible for one of the drivers to rest while the other drives, and to alternate so that no driver becomes overtired. In this case, however, it is quite frequently desired to be able to keep track of the time during which one or the other driver operates the vehicle or, putting this conversely, to be able to keep track of the time during which one or the other of the drivers is resting. This information may be desired for purposes of calculating the drivers' wages, and it may even be required by law since many countries have regulations which specify (on a daily basis) the maximum number of hours during which a driver may consecutively operate the vehicle, and the minimum number of hours during which he must be able to rest. To be able to obtain this type of information with a trip recorder it is necessary that the trip recorder either be capable of operating in two different modes, in each of which the scribing arrangement or recording arrangement of the recorder makes a record indicative of which of the two drivers operates the vehicle, or else that the recorder be provided with two separate recording arrangements which are selectively operated in dependence upon which of the drivers is operating the vehicle. In either case the trip recorder is provided with a manually operable adjusting arrangement which permits the driver who takes over the operation of the vehicle to select that mode of operation of the trip recorder which will indicate that it is this particular driver who is operating the vehicle.

The prior art provides each of the drivers with a key which is inserted into the trip recorder and either makes one of the two recording arrangements operative and the other one inoperative, or which switches a single recording arrangement from one mode of operation to another mode of operation. One particular type of trip recorder has a cover which can be opened to insert the disc-shaped record carrier at the beginning of a trip, and which is provided with a latching arrangement to lock it in a closed position. One of the keys then serves to lock the cover, and two additional keys are provided, one for each of the drivers, and each serving to displace the lock cylinder of the lock (while the latter is in locked condition) to one of two positions, the lock cylinder being connected in operative relationship with the recording arrangement so as to set it for the desired mode of operation.

Experience has shown, however, that even this last-mentioned type of trip recorder requires some further improvement. In particular, it is disadvantageous that each of the drivers must carry his key with him during the entire trip, since this brings with it the evident possibility that the key might be lost and that for the remainder of the trip it might not be possible to readjust the trip recorder so as to reflect the fact that the driver whose key has been lost is actually operating the vehicle and should be receiving wages for this time. Moreover, it is quite frequently observed that these keys, once inserted, are not removed until the next driver takes over. Since these trip recorders are located in the operator's cabin to permit ready access, this brings with it the danger that the outwardly protruding key might represent a hazard in the event of accidents. Finally, at times it occurs that one of the mode-setting keys is mistaken for the key which latches and unlatches the cover, so that the attempted insertion and operation of the wrong key may cause damage not only to the key but to the lock itself.

SUMMARY OF THE INVENTION

Accordingly, it is a general object of the invention to provide an improved vehicle trip recorder which avoids the aforementioned disadvantages.

More particularly, it is an object of the invention to provide a vehicle trip recorder of the type under discussion which avoids the necessity for key operation to readjust it from one operative mode to another operative mode.

In keeping with the above objects, and with others which will become apparent hereafter, one feature of the invention resides, in a vehicle trip recorder of the type having a housing, a recording arrangement in the housing which scribes a record indicative of vehicle utilization, an adjusting arrangement for adjusting the recording arrangement to operate in one or another operative mode thereof, and a cover for the housing which can be latched, an improvement which comprises cooperating latching portions on the cover and the housing and being engageable for latching the cover, and actuating means accessible exteriorly of the cover and being operative in the latched condition of the latter for displacing some of the latching portions in the engaged condition of the same between two control positions in each of which they operate upon the adjusting arrangement to effect adjustment of the recording arrangement to one of the operative modes thereof.

With the trip recorder according to the present invention it is now no longer necessary for the driver or drivers to utilize a key to set the trip recorder to the particular mode of operation which indicates that a particular one of the drivers is operating the vehicle. Rather, it is merely necessary to operate the actuating means which does not require the use of a key. The absence of keys for these adjusting functions eliminates the possibility that the keys might be lost, the possibility that one of the keys might be left inserted and might cause an accident hazzard, and the possibility that the wrong key might be inserted in an attempt to either unlock the cover of the trip recorder or to set the trip recorder to a particular operative mode.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
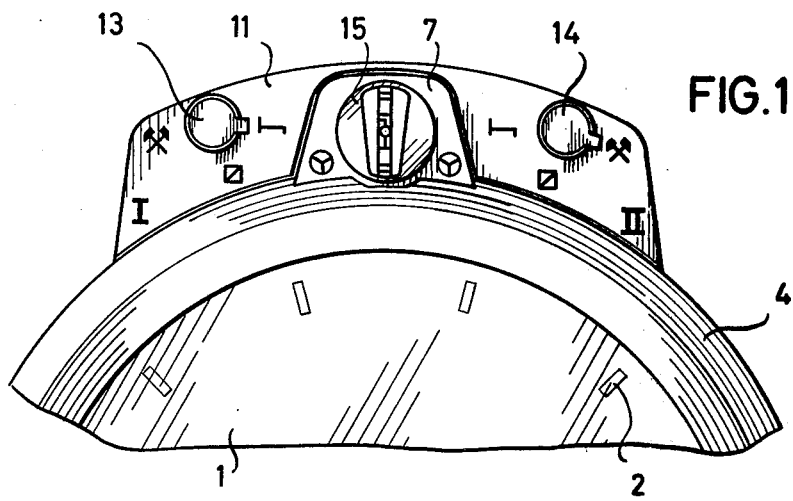
FIG. 1 is a fragmentary front-elevational view of a trip recorder according to the present invention.

Referring in detail to the drawing, and firstly discussing FIG. 1, it will be seen that in this Figure we have illustrated a portion of a vehicle trip recorder which, it should be understood, is conventional in its construction and operation except for the details of the invention which will be discussed subsequently with respect to FIGS. 2-9.

A vehicle trip recorder having one or two scribing devices which can be selectively operated and set for two modes of operation is disclosed e.g. in the U.S. Pat. Nos. 3,624,654, 3,004,818 the French Pat. No. 1,322,397 or the German Utility Model No. 1,744,619. The particular prior-art device mentioned is disclosed in the German Pat. No. 1,039,266.

The trip recorder shown in FIG. 1 has the usual dial 1 which is exposed to view and is provided with speed indicating markings 2. This is of no consequence for the invention, being entirely conventional. It is well known that in conventional manner such a dial 1 is connected to the housing 5 — here by means of a mounting ring 3 and a cover ring 4 (see FIG. 2) — of the pivotably mounted cover of the vehicle trip recorder. The cover receives the record carrier on which the record is to be scribed, and the arrangement that drives the time indicator or mechanism, as well as other components; this is also known from the prior art and therefore requires no discussion or illustration, other than to point out that the cover is essentially cup-shaped in order to be able to accommodate these components. When the cover is closed, it extends into the housing 6 of the trip recorder (see FIG. 2). A projection 7 on the cover serves to mount a lock cylinder 8 of a locking arrangement 9 having a latch 10 provided on the lock cylinder 8 and cooperating with an abutment 11 that is formed on the housing 6. The latch member 10 is recessed and movable in a depression 12 of the abutment 11. It should be understood that the latching function can also be obtained in other suitable ways, for instance by means of a radially movable latching member that can be key-operated or moved by shifting an engagement portion or the like. The particular manner in which the latching member 10 can be moved is not important.

Figure 3:
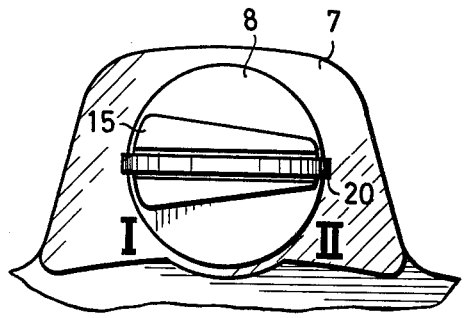
FIG. 3 is an enlarged-scale view of a detail of FIG. 1, showing one setting of the actuating means thereof in which the cover of the trip recorder can be opened.
Figure 6:
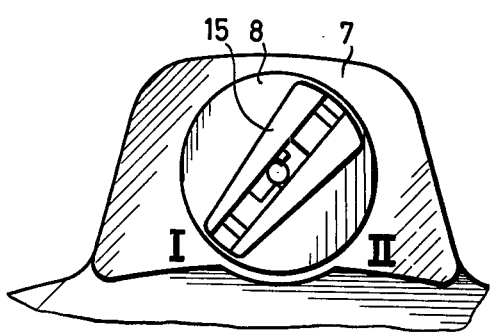
FIG. 6 is a view similar to FIG. 3, showing the actuating means in a position in which the cover of the trip recorder is latched and one operative mode has been selected for the recording arrangement.

In the embodiment of FIG. 1 the abutment 11 partially embraces the projection 7 and extends passed the latter to the left and the right thereof, in circumferential direction of the housing 6. In FIGS. 3 and 6 this has been illustrated differently to show that different possibilities exist, but other than, that these Figures show the embodiment of FIG. 1.

The abutment 11 serves to support the two buttons 13 and 14 which are each intended for use by one of the drivers, the drivers being symbolized by the characters I and II. In accordance with the symbols provided on the abutment 11 these knobs 13, 14 indicate that they are intended to provide for an adjustment of the recording arrangement so that the recording arrangement will either indicate that it is recording a pause (i.e. the time during which the vehicle stands still) or that it is recording an actual operating time period.

The invention is concerned with adjusting the recording arrangement so that it can indicate which one of the drivers I or II is being timed. For this purpose the adjustment is carried out by turning the lock cylinder 8 which is made of greater axial length than would otherwise be required and formed with a knurled knob and/or a transversely projecting rib 15 (see FIG. 3) for engagement by the fingers of a user. The rib 15 may have an arrowhead-shaped configuration, (see FIGS. 3 and 6) in order to optically emphasize whether the recording arrangement has been set to one or the other mode of operation, depending upon whether the rib 15 points to the symbol I or the symbol II.

The movement imparted by turning the cylinder 8 via the knob or rib 15 is transmitted by means of the projection 16 that is formed on the latching member 10, and which engage it in the bifurcated end portion 17 of a lever 18 which is tiltably mounted on a shaft 19 located in the housing 6, to a scribing device (not shown) or to a device which acts upon such a scribing device (also not shown). Such scribing devices, and devices acting upon the scribing device, are known from the prior art and their action is not important for an understanding of the invention. It is merely necessary to point out that if a device is interposed between the lever 18 and the scribing device, then this interposed device (which is used when two scribing devices are employed) will serve to activate one of the scribing devices and deactivate the other one. If a single scribing device is provided, then it may be shifted between two operative modes in which it scribes lines of different thickness, or in which the lines scribed by it have different positions with reference to a base line on the record carrier, or the like. The scribing device itself may be driven in suitable manner, for instance by an electromotor.

Figure 2:
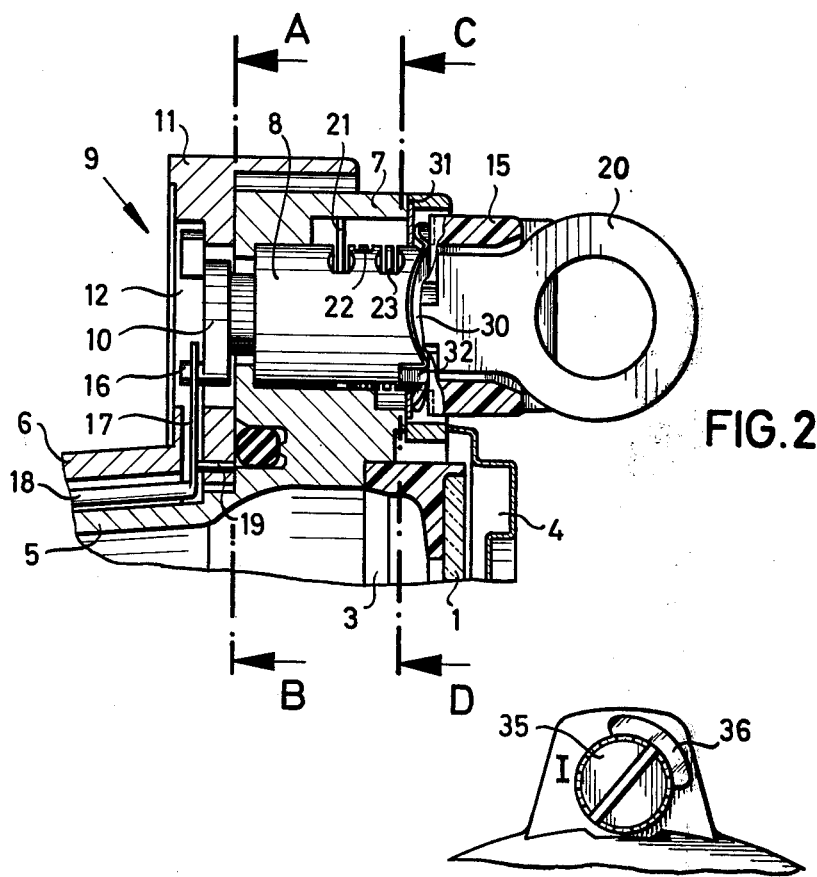
FIG. 2 is a vertical section through the trip recorder shown in FIG. 1, on a plane parallelling that of the drawing.
Figure 4:
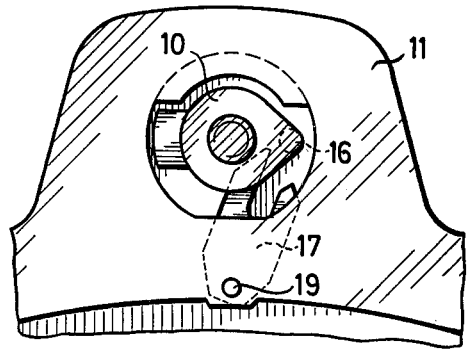
FIG. 4 is a diagrammatic section on line A-B of FIG. 2, showing the position of certain components when the actuating means is in the position illustrated in FIG. 3.

The operation of the trip recorder of FIGS. 1 and 2 will now be described with reference to FIGS. 3–8. FIG. 3 shows a position in which a key 20 is inserted into the inlet opening of the lock cylinder 8, so that the latter can be turned to a position in which the cover can be opened as indicated in FIG. 4, due to the fact that the pin 16 on the member 10 has been moved outside the bifurcated end portion of the lever 18, and the latching member 10 itself has been moved to a position in which it permits opening of the cover. In this position one of the latching portions 21, 22 and 23, which are disc-shaped in configuration and constitute a part of the lock or latching arrangement 9, and which are each biased by a respective spring 24 (see FIG. 5) and guided in appropriate slots in direction transversely to the longitudinal axis of the lock cylinder 8, engages the surface 25 of its associated opening 26 in the projection 7, and prevents a further turning movement of the lock cylinder 8 in counterclockwise direction. In this position the key 20 cannot be withdrawn and therefore cannot become lost, because the latching portion 23 is located outside its associated opening 27 and therefore cannot yield as would be required to permit withdrawal of the key 20.

Figure 7:
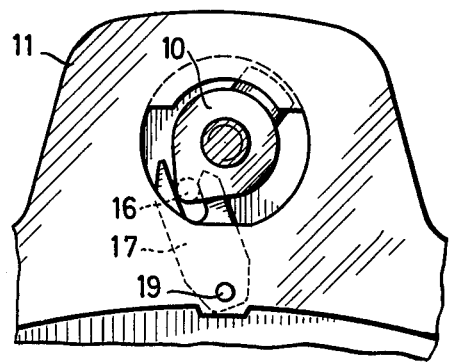
FIG. 7 is a diagrammatic section on line A-B of FIG. 2, but showing components of FIG. 2 in positions which they assume when the actuating means has been set to the position shown in FIG. 6.
Figure 5:
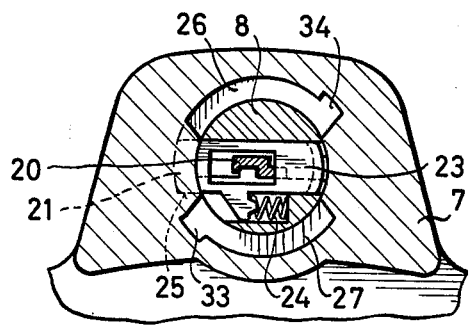
FIG. 5 is a section taken on line C-D of FIG. 2, showing the position of other components when the actuating means is in the position of FIG. 3.
Figure 8:
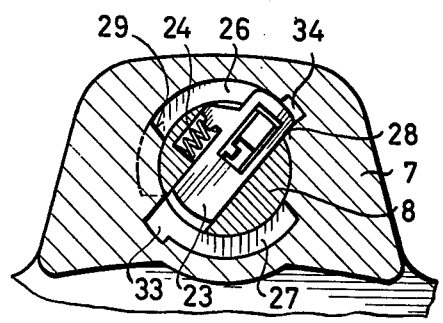
FIG. 8 is a section on line C-D of FIG. 2, but showing the position of components of FIG. 2 which they assume when the actuating means is in the position shown in FIG. 6.

FIG. 6 shows by way of contrast an adjustment of the trip recorder in which the latter is, for example, set to one operative mode of the recording arrangement which corresponds to the recording of information for the driver designated by symbol I. This setting is indicated by the fact that the tip of the arrowhead-shaped rib 15 points towards the symbol I. In this position the cover is closed and the key 20 removed. The latching portions 21, 22 and 23 engage the surface 28 of the opening 26 and prevent turning of the lock cylinder 8 in clockwise direction. FIG. 7 shows that in this position the projection 16 is in engagement with the bifurcated end portion 17 of the lever 18.

In this setting the (non-illustrated) recording arrangement will scribe information pertaining to the operation of the vehicle under the control of driver I. If, now, driver II assumes control of the vehicle, then he engages the knob or rib 15 manually and thereby turns the lock cylinder 8 until the latching portions 22 and 23 engage the surface 29, at which time the arrowhead of the rib 15 will point to symbol II and the recording arrangement is now set to scribe a record of the operation of the vehicle under the control of driver II. With respect to FIG. 7, this would result in a displacement of the members 10 and 17 to a position which is symmetrical with reference to the position shown in FIG. 7, and in which the projection 16 is still accommodated in the bifurcated end portion 7. No key is required for this readjustment.

Assuming that the readjustment from the operative mode associated with symbol I to the operative mode associated with symbol II (or vice versa) is carried out with the key 20 still in place, then in the mode II the surface 29 will be ineffective because the latching portions 22 and 23 are in this case retracted into the lock cylinder 8 by the presence of the key 20. However, an abutment located between a spring 30 and the lock cylinder 8 permits the user to feel the proper setting required to place the arrowhead of the rib 15 so that it will point at the symbol II. The position associated with the symbol I is in this case determined by the latching portion 21 which cooperates with the surface 28.

The spring 30 (see FIG. 2) is annular and of undulating configuration; it abuts the lock cylinder 8 and a washer 31, respectively, and in addition to providing the position-defining pressure points which are felt by the user when he turns the lock cylinder 8, this spring serves the additional function of preventing free axial play of the lock cylinder 8. It is provided with lugs which engage into cooperating recesses 33, 34 of the projection 7; one of these lugs, identified with reference numeral 32, is visible in FIG. 2 and serves, in conjunction with the other, to prevent the spring 30 from turning.

Figure 9:
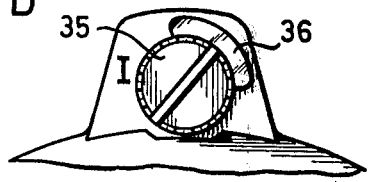
FIG. 9 is a view similar to FIG. 6, showing a further embodiment of the invention.

FIG. 9, finally, shows in a simplified manner a further embodiment of the invention, indicating that the knob 35, which is again of knurled configuration, may instead of the arrowhead-shaped indicating rib be provided with a flag-portion 36, for instance a portion having a different color than the surrounding components, and which exposes that symbol (in FIG. 9 the symbol I) indicative of the scribing mode that has been selected, covering the other symbol, namely the symbol II in FIG. 9.

It will be understood that each of the elements described above, or two or more together, may also find a useful application in other types of constructions, differing from the types described above.

While the invention has been illustrated and described as embodied in a vehicle trip recorder, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In a vehicle trip recorder of the type having a housing, a recording arrangement in said housing which scribes a record indicative of vehicle utilization, an adjusting arrangement for adjusting said recording arrangement to operate in one or another operative mode thereof, and a cover for said housing which can be latched, an improvement comprising cooperating latching portions on said cover and said housing and being engageable for latching said cover; and actuating means accessible exteriorly of said cover and being operative in the latched condition of the latter for displacing some of said latching portions in the engaged condition of the same between two control positions in each of which they operate upon said adjusting arrangement to effect adjustment of said recording arrangement to one of said operative modes thereof.

2. In a vehicle trip recorder as defined in claim 1, wherein said latching portions comprise a recess in said housing, and a key-operated cylinder lock on said cover, said lock having a cylinder which extends in part at an outer side of said cover and is manually turnable.

3. In a vehicle trip recorder as defined in claim 2, wherein said part is formed with a knurled knob portion.

4. In a vehicle trip recorder as defined in claim 3, wherein said knob portion has a free end formed with a projecting rib that extends across said free end.

5. In a vehicle trip recorder as defined in claim 4, wherein said rib is at least in part shaped to resemble an arrowhead; and wherein said housing is formed with a pair of marks each indicative of one of said control positions, and to which the arrowhead-shaped rib can be respectively made to point.

6. In a vehicle trip recorder as defined in claim 5; and further comprising detent means operative for releasably retaining said cylinder in the respective control positions thereof.

7. In a vehicle trip recorder as defined in claim 3, wherein said housing is formed with a pair of marks each indicative of one of said control positions; and wherein said cylinder is provided with a flag portion that turns with said cylinder and cooperates with said marks for indicating the setting of said cylinder to a respective one of said control positions.

* * * * *